US006813361B1

(12) United States Patent
Jeffs et al.

(10) Patent No.: US 6,813,361 B1
(45) Date of Patent: Nov. 2, 2004

(54) NON-CONTACT AUDIO FADER CONTROL SYSTEM AND METHOD

(75) Inventors: Philip R. Jeffs, Snohomish, WA (US); Paul Mathews, Langley, WA (US)

(73) Assignee: Rane Corproration, Mukilteo, WA (US)

( * ) Notice: Subject to any disclaimer, the term of this patent is extended or adjusted under 35 U.S.C. 154(b) by 460 days.

(21) Appl. No.: 10/015,249

(22) Filed: Dec. 11, 2001

(51) Int. Cl.[7] .................................................. H04B 1/00
(52) U.S. Cl. ............................................ 381/119; 369/4
(58) Field of Search ................................ 381/119, 104, 381/107, 109; 369/4, 3; 324/270.2, 270.13; 341/15; 84/660, 697, 615

(56) References Cited

U.S. PATENT DOCUMENTS

| | | | | | |
|---|---|---|---|---|---|
| 5,293,102 | A | * | 3/1994 | Martinson et al. | 318/2 |
| 5,317,641 | A | * | 5/1994 | Yasuda et al. | 381/119 |
| 5,719,570 | A | * | 2/1998 | Breitbarth | 341/13 |
| 5,734,731 | A | * | 3/1998 | Marx | 381/119 |
| 5,940,521 | A | * | 8/1999 | East et al. | 381/119 |
| 6,094,491 | A | * | 7/2000 | Frindle et al. | 381/119 |
| 6,181,798 | B1 | * | 1/2001 | Steers | 381/119 |
| 2003/0152241 | A1 | * | 8/2003 | Eastty et al. | 381/109 |

FOREIGN PATENT DOCUMENTS

| | | | | |
|---|---|---|---|---|
| JP | 2003-193367 | * | 1/2003 | G01D/5/34 |

* cited by examiner

*Primary Examiner*—Xu Mei
(74) *Attorney, Agent, or Firm*—Black Lowe & Graham PLLC

(57) ABSTRACT

A non-contact fader control uses a movable permanent magnet and one or two Hall-effect sensors to provide a constant, direct current voltage output. Signal conditioning and digital control circuitry linearize the output and otherwise precondition the output for application to a voltage controlled amplifier for the control of audio output in an audio mixing board.

20 Claims, 6 Drawing Sheets

FIG.4
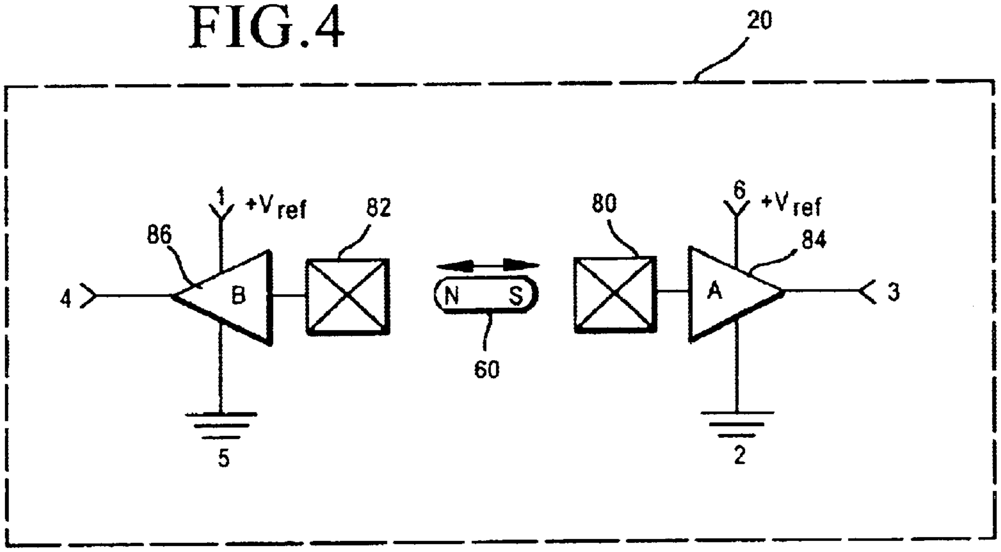
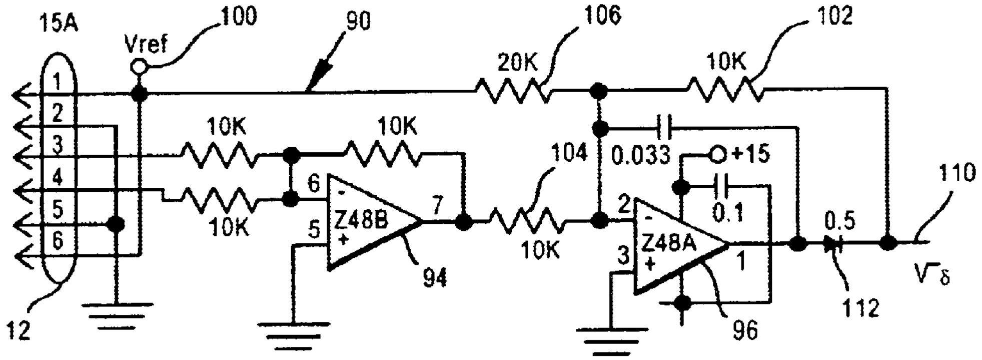
FIG.5
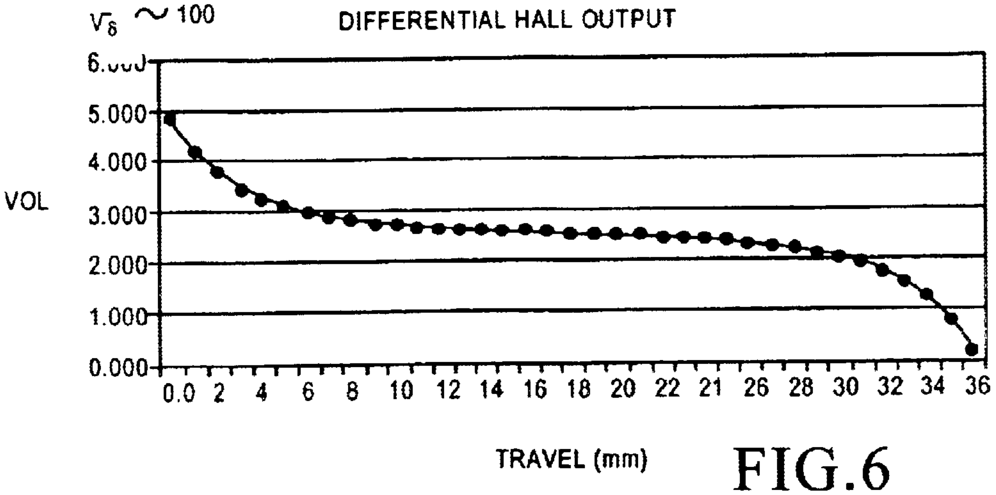
FIG.6

NON-CONTACT AUDIO FADER CONTROL SYSTEM AND METHOD

TECHNICAL FIELD

The invention relates to apparatus and methods for determining the absolute position of a movable member with respect to one or more fixed members. More specifically, the invention relates to apparatus and methods for determining the absolute position of a manual control for audio systems.

BACKGROUND OF THE INVENTION

A wide variety of prior art devices and techniques have been developed for determining the absolute position of a movable member with respect to a nonmovable member, or vice versa. Such systems typically rely on a unique physical characteristic which exists with respect to each relative position of the movable and nonmovable members. Such characteristic may be due to resistive, capacitive, inductive, optical, or magnetic properties of the relatively movable members. Systems which are based on one of the above physical properties typically have widely varying characteristics with respect to: i) resolution (the size of the smallest incremental movement which can be detected by the system); ii) repeatability (the error within which a given position can be reproduced by the system); and iii) accuracy (the absolute deviation between the desired target position and the actual position of the relatively movable parts of the system). Furthermore, systems of the above type often vary dramatically with respect to cost, assembly complexity, and susceptibility to ambient conditions which affect resolution, repeatability, and/or accuracy.

Audio systems such as public address systems, audio control panels for mixing audio sources in various venues (e.g., radio studios, theaters, discotheques, etc.) and even home audio systems employ a variety of manual controls in which the output of the manual control is indicative of a particular position of the control with respect to the control panel. In most systems of the type described, the manual control does not itself directly conduct audio power, but rather acts as an indirect control for an amplifier (e.g., a voltage controlled amplifier) which then attenuates or amplifies the audio signal of interest. In this type of application while accuracy and repeatability are important, resolution is more so. Nevertheless, the most important feature for most consumers relates to the lack of electrical noise in the sensor which is otherwise also amplified by the voltage controlled amplifier. For discriminating consumers, the feel of the control (i.e., constant drag with change of position and over time) and durability are also important. Secondary considerations include cost and the absence of “bleed” in audio fader controls. “Bleed” represents the ability of the audio fader control to completely attenuate an audio signal which is controlled by the manual sensor.

Traditionally, potentiometers and variable linear resistors have been used in audio fader control systems because of the relatively low cost of components of this type and large travel distance (particularly with respect to linear resistive control elements) which is highly desirable to audio mixer artists. Conventional wire wound variable resistors having movable wiper arms have been supplanted by the variable resistor of the type having a carbonized resistive element imprinted on a printed circuit board. This mechanical arrangement advantageously facilitates the manufacture of a variable resistor having variable incremental resistance. That is, each incremental movement of the linear fader control produces a non-linear change in the resistor value. This can be achieved by either varying the width or thickness of the resistive trace on the printed circuit board. Such variability is highly desirable because where controls of this type are used for volume control, the human ear’s impression of constant volume change is itself non-linear. Those of ordinary skill in the relevant art are well aware that human perception of increasing volume is not only non-linear, it is essentially logarithmic. This relationship has been quantified by a variety of specialists in the art and is commonly known as a “standard listener curve”. By matching the thickness and/or width of the resistive carbon material on the printed circuit board of a linear variable resistor with a standard listener curve, variability of resistance with respect to position can be produced so as to closely match the standard listener curve. Thus, ordinary amplification circuitry can be employed such that an arithmetic physical displacement of the manual control produces an apparent logarithmic equivalent attenuation in volume of an audio signal which is operatively coupled to that control.

Unfortunately, printed circuit board linear variable resistors of the type described above suffer from a number of defects. First among these defects relates to travel noise associated with movement of the fader control. That is, as the wiper arm traverses the resistive path, microscopic arcing occurs because the travel path itself is not perfectly smooth. Indeed, as the travel path begins to wear, arcing becomes more pronounced, is amplified through the voltage control amplifier, and is heard as a popping or crackling sound by the listener. This problem is only exacerbated by further use and wear. A professional audio mixing artist may cycle an audio fader control up to twenty cycles per second for hours on end. Yet, the life cycle of a typical linear resistive element of the type described may be as little as 10,000 cycles. As the carbonized surface of the printed circuit board begins to wear under the action of the wiper arm, not only is the noise problem exacerbated, but the linear resistor begins to bleed. That is, bringing the wiper to the fully attenuated position associated with its end of travel no longer fully attenuates the signal. A second problem associated with contact type controls such as linear resistors is that the “feel” of the control (i.e., the coefficient of friction of the carbonized surface) is non-constant either over time, or from one end of travel to the other. A good feel which is constant over time is an important characteristic for artists in this field. Finally, the most demanding artists require significant accuracy with respect to controls of this type. However, faders with resistive elements of the type described above typically have an accuracy of no better than ±20% total travel length. Thus, even if the repeatability and resolution of the control are good (which typically is not the case), scale markings on the fader control are of little use to the artist due to the low accuracy of the control itself.

Those of ordinary skill in the prior art have recognized the above described limitations of conventional resistive controls, and therefore have developed non-contact position sensors of the capacitive, inductive, optical, and magnetic type. With respect to optical control systems, an optical encoder/decoder system is described by Yochum in U.S. Pat. No. 4,412,812 for use as an audio fader control. In that system, a movable control handle is connected to a linear shutter which is disposed between corresponding pairs of light emitting diodes and light detectors. By appropriately positioning the emitter/detector pairs with respect to various apertures in the shutter, any unique, absolute position of the shutter can be instantaneously determined by digital logic circuitry connected to the light detectors. In addition, the digital information which corresponds to a unique position of the shutter (and thus control handle) can be used to access a digital look-up table in the form of a read-only memory (ROM) which may be provided with a non-linear transfer function, presumably to match the position of the control handle to a standard listener curve. Yochum further describes that more than one ROM can be provided, selected by an appropriate switch, to provide two or more listening curves.

The system described by Yochum avoids all of the disadvantages associated with resistive, contact-type fader control. Nevertheless, Yochum's system requires at least 13 optical emitter/detector pairs and a mechanical shutter system to provide only 66 unique resolvable positions, although the 8 bit digital logic of the circuitry described therein is capable of storing up to 256 unique data points. Thus, the mechanical constraints of an optical system of this type is a limiting factor in achieving a system with high resolution. In addition, the large number of sensor/detector pairs increases the cost and complexity of manufacturing the device. Finally, the device has a limited range (i.e, linear travel) due to the relatively large physical size of the shutter and emitter/detector pair array. Thus, the effective travel length of the device is inadequate for the most discriminating users.

It has been suggested that magnetic field effects can be used in a digital fader control. Vestax Corporation, Tokyo, Japan, has announced that it will produce such a product.

The desirability of using magnetic sensors for non-contact position information is in itself well known in the art. Skalski has disclosed an elevator control system utilizing non-contact, Hall-effect sensors in a variety of United States patents (e.g., U.S. Pat. Nos. 5,294,757; 5,617,023; and 5,329,077). The Hall-effect is a consequence of the Lorentz force in which a current moving through a sheet of material in the direction of an electric field when subjected to a transverse, steady-state magnetic field results in a voltage appearing in the conductor material transverse to the direction of current flow. In a rectangular sheet of conductive material charges eventually build up on the edges of the sheet which are transverse to the direction of the electrical field, causing a counter-force on the charge carriers moved under the influence of the electrical field. Once the counter-force is in equilibrium with the Lorentz force, a constant voltage will appear at the transverse edges of the conductive sheet, resulting in a transverse electric field. That transverse electric field is measured as the Hall-potential voltage. Thus, as long as there is an electric current flowing through the sheet and a magnetic field applied to the sheet, the Hall-effect voltage will be present whether or not the flux source which generates the magnetic field is in motion or stationary. The magnitude of the Hall-effect voltage is proportional to the cross product of the current flowing through the conductive sheet and the magnetic field applied to the sheet.

Modern Hall-effect sensors have been developed which are relatively inexpensive, have low noise, low offset drift, excellent temperature stability, and very high accuracy, repeatability, and resolution. Thus, Hall-effect sensors have found application in a variety of devices. One example is illustrated by Petersen in U.S. Pat. No. 4,658,214 in which two adjacent Hall-effect sensors are used to detect the displacement of a junction between adjacent north and south poles of two permanent magnets. The position of the magnets is driven by a coil winding, while the magnets themselves are connected to an operative device, such as a camera shutter. Computer controlled circuitry is disclosed which compares a current position of the magnetic junction with respect to a previous position in a feed-back loop to determine whether a motion command has been fully executed. Over a limited range, the flux density in the vicinity of a junction between the north and south magnet poles is substantially linear. This regime is used by the invention described in the '214 patent. The device disclosed therein is useful for determining displacements of approximately one-half inch. Thereafter, the magnetic flux density is indeterminate with respect to the Hall-effect sensors.

Similarly, the Hall-effect sensors used in the Skalski disclosure are described as being useful to measure displacements on the order of only a few millimeters, whereas audio mixing artists prefer a travel distance for a linear fader control to be on the order of 35 to 40 mm or more.

Thus, a need exists for a non-contact, noiseless, linear fader control for audio applications having long travel length, high accuracy, low cost, and ease of assembly. Such a fader control should also have a long product life cycle and consistent feel over time. The ideal fader control should be impervious to variable ambient conditions and to liquids and sprays which may be applied thereto, and also immune to bleed. Further yet, the desired fader control should have an electrical output well adapted for use by digital signal processing equipment.

SUMMARY OF THE INVENTION

It is therefore an object of the present invention to provide an improved fader control for audio applications which is noise-free, has a usable life span of over one million cycles, has a long travel length, has a consistent feel throughout its product life, and is relatively immune to temperature variations, humidity and corrosion.

It is a further object of the invention to provide a fader control which achieves the above objects while being immune to audio bleed and which advantageously uses the natural relationship between flux density and distance to achieve a constant power curve response, also known as a standard listener curve.

It is yet another object of the present invention to achieve the above objects and advantages with a fader control that is part of a system which permits an audio artist to apply an output of the fader control to a digital gain transformation system, permitting the convolution of two data sets, whose mixing is controlled by the audio artist through the output of another manual control to provide a completely custom gain transfer function for the audio mixing artist.

The invention achieves the above objects and advantages, and other objects and advantages which will become apparent from the description which follows, by providing a linear position sensor having a permanent magnet mounted on a lineally-translatable carrier. The carrier is movable between two relatively fixed, spaced-apart magnetic flux detectors, one facing the north pole of the magnet, the other facing the south pole of the magnet. The flux detectors have opposite polarities and are electrically inter-connected such that their combined outputs provide an analog position signal having a magnitude indicative of a specific, monotonic, linear position of the magnet with respect to the flux detectors.

In a preferred embodiment of the invention, the carrier rides on two elongated, laterally spaced apart rails which are parallel to the flux axis of the magnet. The flux detectors are preferably Hall-effect sensors which, when provided with a constant power supply, provide a direct current voltage at the electrical output of each flux detector which is indicative of the position of the magnet and the carrier, even if the carrier and magnet are at rest. The rails are preferably manufactured from a highly polished, durable, non-ferrous material, and the carrier is preferably made from a low friction material to provide an improved feel for the control. The carrier and rails may be provided with a drag-inducing mechanism to properly "weight" the carrier. This mechanism may be in the form of a torsion spring.

In the preferred embodiment of the invention, the non-contact fader control of the present invention can be operatively connected to a digital processing circuit which digitizes the analog output from the magnetic flux detectors for subsequent processing, after which the digitized signal is reconverted into an analog signal which controls a conventional voltage controlled amplifier, into which is fed an audio input of choice. The resulting ultimate audio output from the voltage-controlled amplifier is thus a function of the position of the fader control. The digital signal processing circuit can provide a variety of operations on the digitized fader control position information, including low pass filtering, correcting for any initial offset error from the factory, a "hysteresis" offset function in which any uncertainty in the least significant bit (LSB) of the digital word which represents the fader control position is determined, and "linearization" of the digital signal by normalizing the signal against a "standard listener curve" so as provide a constant power curve response for the ultimate audio output. In addition to the above, the digital processing circuitry can be provided with input from a contour control, in which the contour control mixes data from two different data tables, each table providing a different audio gain transfer function. Thus, the audio artists can customize the ultimate audio output gain curve after the audio transfer function has been adjusted for a variety of factors, including constant apparent power output (i.e., apparent volume).

In an alternate embodiment of the invention, the direct current output of one or more Hall-effect sensors is applied to an analog conditioning circuit which appropriately matches the magnetic properties of the contour control itself such as to mimic the application of a standard listener curve to the fader control sensor output for subsequent application to the voltage controlled amplifier described above.

BRIEF DESCRIPTION OF THE DRAWINGS

FIG. 4 is an electronic schematic representation of the fader control shown in FIGS. 1 through 3.

FIG. 5 is a schematic representation of an electronic signal conditioning circuit connected to the fader control of FIGS. 1 through 4.

FIG. 6 is a graph indicating the relationship between the position of the permanent magnet shown in FIG. 1 with the output voltage of the circuit shown in FIG. 5

DETAILED DESCRIPTION OF THE PREFERRED EMBODIMENTS

Figure 1:
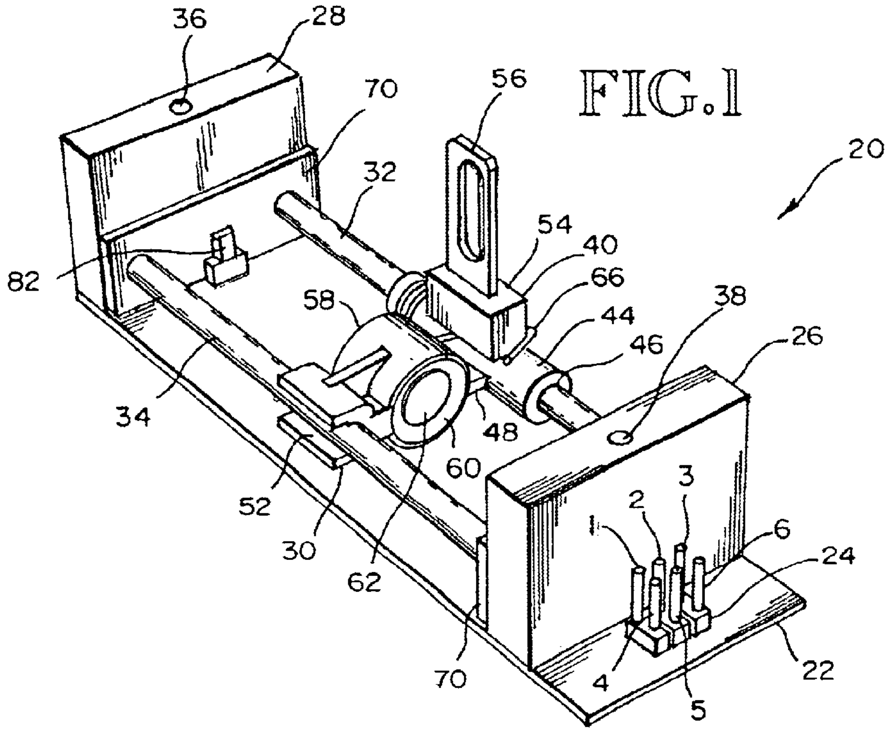
FIG. 1 is an environmental, isometric view of a non-contact, audio fader control of the present invention.
Figure 2:
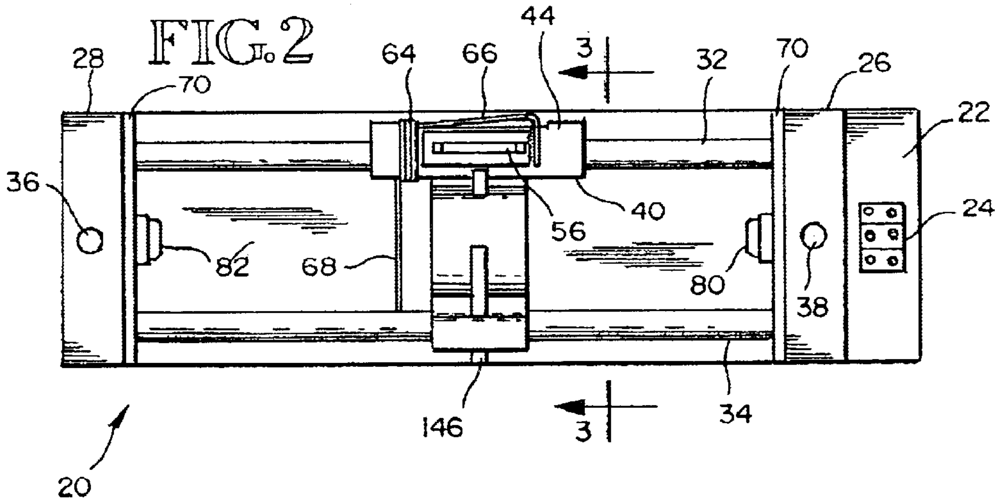
FIG. 2 is a top plan view of the fader control.
Figure 3:
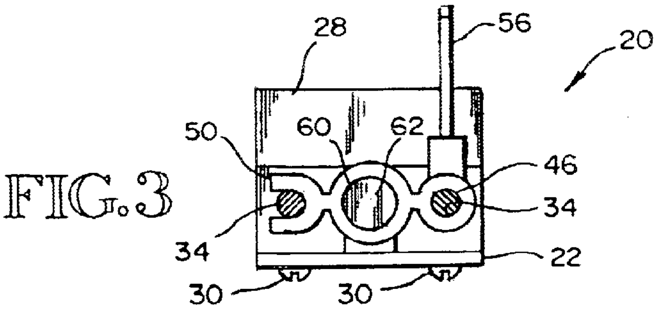
FIG. 3 is a cross-sectional, elevational view taken along line 3—3 of FIG. 2.

A non-contact magnetic fader control, in accordance with the principles of the invention, is generally indicated at reference numeral 20 in FIGS. 1 through 4 and 11. A first embodiment of the fader control 20 is shown in FIGS. 1 through 4 and includes a printed circuit board 22 having a plurality of electrical traces (not shown) thereon in the conventional manner, terminating in an electrical connector block 24 having pins through 1 through 6 as shown. The printed circuit board 22 also supports structural blocks 26, 28 such as by screws 30 for supporting in a spaced apart relationship first and second linear bearing rods 32 and 34. The cylindrical rods are approximately 70 mm long and are separated laterally by a distance of approximately 22 mm. The rods 32, 34 are journaled in the structural blocks 26, 28 so as to be fixed therein. The structural blocks are preferably provided with screw holes 36, 38 for mounting the fader control 20 to an audio mixing panel (not shown) or the like. Structural blocks 26, 28 are preferably manufactured from a non-ferrous material, such as thermoplastic.

The rods 32, 34 slidably support a carrier member 40 preferably manufactured from a thermally stable, non-ferrous, low friction material such as Delrin® AF manufactured by Dupont. Delrin® 100 AF has approximately 20% Teflon® filler, making it possible to achieve a high-quality, one-piece carrier with integral, load-bearing anti-friction properties. The carrier and rods assembly is highly wear resistant. A prototype part was cycled over 13,000,000 times at 10 cycles per second with no measurable wear. The linear bearing rods 32, 34 are preferably manufactured from highly polished 303 stainless steel, which is a non-ferrous material.

The carrier member 40 has a first cylindrical portion 44 defining an aperture 46 for sliding receipt of the first rod 32. The carrier member further has a laterally projecting portion 48 terminating in a C-shaped member 50 defining an elongated cavity 52 for sliding receipt of the second rod 34. The carrier member 40 also has a vertically projecting portion 54 into which a stud 56 is co-moulded. The stud 56 is made from non-ferrous stainless steel and is adapted for receipt of a control handle or the like (not shown). Thus, the carrier can be translated up and down the rails 32, 34 by manipulating a handle or the like attached to the stud 56. The carrier member 48 is further provided with a second cylindrical portion 58 intermediate the C-shaped member 50 and the first cylindrical portion 44. The second cylindrical portion 58 is provided with a second cylindrical cavity 60 for receipt of a permanent magnet 62. The permanent magnet is preferably manufactured from neodymium-iron-boron (NdFeB) grade 35 and has an intrinsic flux density of 12,300 gauss which has been stabilized at approximately 11,000 gauss. An alternative appropriate magnetic material could be samarium-cobalt (SmCo). The permanent magnet 62 has a ratio of diameter to length of approximately 1 to 1. In the preferred embodiment the magnet diameter is approximately ¼ in. and the length is approximately ¼ in.

In order to provide an appropriate drag feel to the non-contact magnetic fader control 20, the carrier member 40 is provided with a torsion spring 64, having a first arm 66 reacting against the first cylindrical portion 44 and a second, elongated arm 68 reacting against the second rod 34. The torsion spring is preferably manufactured from a non-ferrous material. The second elongated arm 68 preferably applies a force of approximately 40 to 60 grams to the second rod 32 (i.e., a torque of approximately 40 to 60 gram inches). This results in a drag force of about 20 g., which is approximately equal to the weight of the carrier 44/permanent magnet 62 combination. It has been found that by equalizing the weight of the moving member with the applied drag, an optimal "feel" can be provided for the audio mixer artist operating the control 20. The structural blocks 26, 28 are preferably provided with foam rubber pads 70, 72 adjacent to the rod ends to cushion the end of travel of the carrier member 40.

The printed circuit board 22 supports first and second magnetic flux detectors 80, 82 adjacent to the ends of the first and second rods 32, 34 so as to be supported against the foam rubber pads 70, 72 and the structural blocks 26, 28. The flux detectors are preferably positioned such as to be on the flux axis defined by the permanent magnet 62. Similarly, the first and second rods 32, 34 are also preferably positioned so as to be parallel to the flux axis, whereby the respective north and south faces of the permanent magnet can be translated to within a few millimeters of the flux detectors. The working travel of the permanent magnet is approximately 37 mm.

In the preferred embodiment of the invention, the flux detectors are Hall-effect sensors which operate in accordance with the Lorentz force. It is well known that if a magnetic field is applied across a sheet of conductive material carrying a current that a force (the Lorentz force) will be applied to a charge carrier moving in the direction of the current flow. Charge carriers will thus accumulate on one transverse edge of the current carrying sheet. In accordance with electrostatic principles, a corresponding number of oppositely charged carriers will migrate to the opposite lateral edge of the sheet until an equilibrium is reached. The potential difference between the two edges at equilibrium is known as the Hall-effect voltage and can be measured by a variety of sensors such as the Allegro Model A3515LUA Hall-effect sensor, which is commercially available. This sensor has exceptional linearity, low noise, low offset drift, and low sensitivity drift over temperature. The dynamic range of this sensor is in excess of 80 dB.

The non-contact magnetic fader control 20 is schematically electrically represented in FIG. 4 wherein corresponding parts are marked with like reference numerals. The flux sensors 80, 82 include integral buffers 84, 86, which permit supply voltages and ground to be shared in common with signal conditioning circuitry to be described hereinbelow. The outputs of the flux sensors 80, 82 appear on pins 3 and 4, respectively, of the electrical connector block 24. As stated above, as long as power is provided to the Hall-effect flux sensors 80, 82, an analog voltage will appear at pins 3 and 4 whether or not the carrier 40 (and hence magnet 62) are moving. Thus, at all times the fader control 20 provides a direct current output having a voltage indicative of the absolute position of the handle stud 56 with respect to the structural blocks 26, 28. It should be noted that the first and second flux detectors 80, 82 have inverse magnetic polarities and thus electrical outputs. In this way the electrical outputs of the flux detectors at pins 3 and 4 can be summed to provide the fader control 20 with high resolution over its travel in excess of the functional range of either of the flux sensors individually.

In the embodiment shown in FIGS. 1 through 4, first flux detector 80 provides an output at pin number 3 of between 2.5 volts and 4.2 volts as the permanent magnet 60 traverses from second flux detector 82 to the first flux detector. Similarly, second flux detector 82 provides a voltage output between 0.8 volts and 2.5 volts while the permanent magnet traverses the distance from the second flux detector 82 to the first flux detector 80. Although each sensor voltage range is only 1.7 volts, the superpositioned voltage is in a range of 3.3 volts to 6.7 volts, and it is this voltage that appears between pins 3 and 4 on the electrical connector block 24. That analog, direct current voltage is preferably applied to a signal conditioning circuit, generally indicated at reference numeral 90 in FIG. 5. In the alternative, each sensor can be read with an A/D connector and the outputs summed prior to further processing in the digital domain.

The signal conditioning circuit 90 includes a connector block schematically represented at reference numeral 92 having pin designations which correspond with the pin designations on electrical connector block 24 on the fader control 20. The signal conditioning circuit 90 basically comprises first and second operational amplifiers 94, 96 connected in a series. Each operational amplifier 94, 96 is configured as a inverting summing amplifier. The first operational amplifier 94 sums the voltages appearing at pins 3 and 4 to the inverting input with unity gain. This operational amplifier therefore acts as an high impedance buffer for the output of the Hall-sensors 80, 82. The first operational amplifier 94 applies this inverted, summed voltage to the inverting input of the second operational amplifier 96 such that one-half the reference voltage 100 (+5 volts) is added to the inverted, summed signals appearing on pins 3 and 4 of the connector block 92. The second operational amplifier 96 is configured such that the feedback resistance 102 and source resistance 104 are each one-half of the source-resistance 106, applied to the reference voltage 100. Thus, the second operational amplifier 96 has the effect of subtracting one-half of the reference voltage (−2.5 volts) from the voltage range 3.3 volts to 6.8 volts appearing at the source resistance 104. Thus, the final analog output voltage 110 is in the range of 0.8 volts to approximately 4.2 volts. A blocking diode 112 can be provided at the output of the second operational amplifier 96 to act as a small signal diode and to prevent voltage surges should the electrical connector blocks 24 and 92 become inadvertently disconnected while the power supply is on.

FIG. 6 provides a graphical representation of the analog output voltage $V_0$ 100 with respect to the travel position of the magnet 62 shown in FIGS. 1 through 4. As can be seen, when the magnet is close to the Hall-effect sensors, the output is substantially non-linear but is substantially linear in the middle of travel position when the magnet is distant therefrom. It should be noted that the output voltage $V_0$ occurs at each travel position whether or not the magnet is moving. It is also apparent that the analog output voltage is monotonic. That is, it is irrelevant in which direction the magnet is traveling—the same voltage is always obtained with respect to a specific magnet position. Thus, the fader control 20 and analog signal conditioning circuit 90 operate as a true, non-contact absolute position sensing system.

Figure 7:
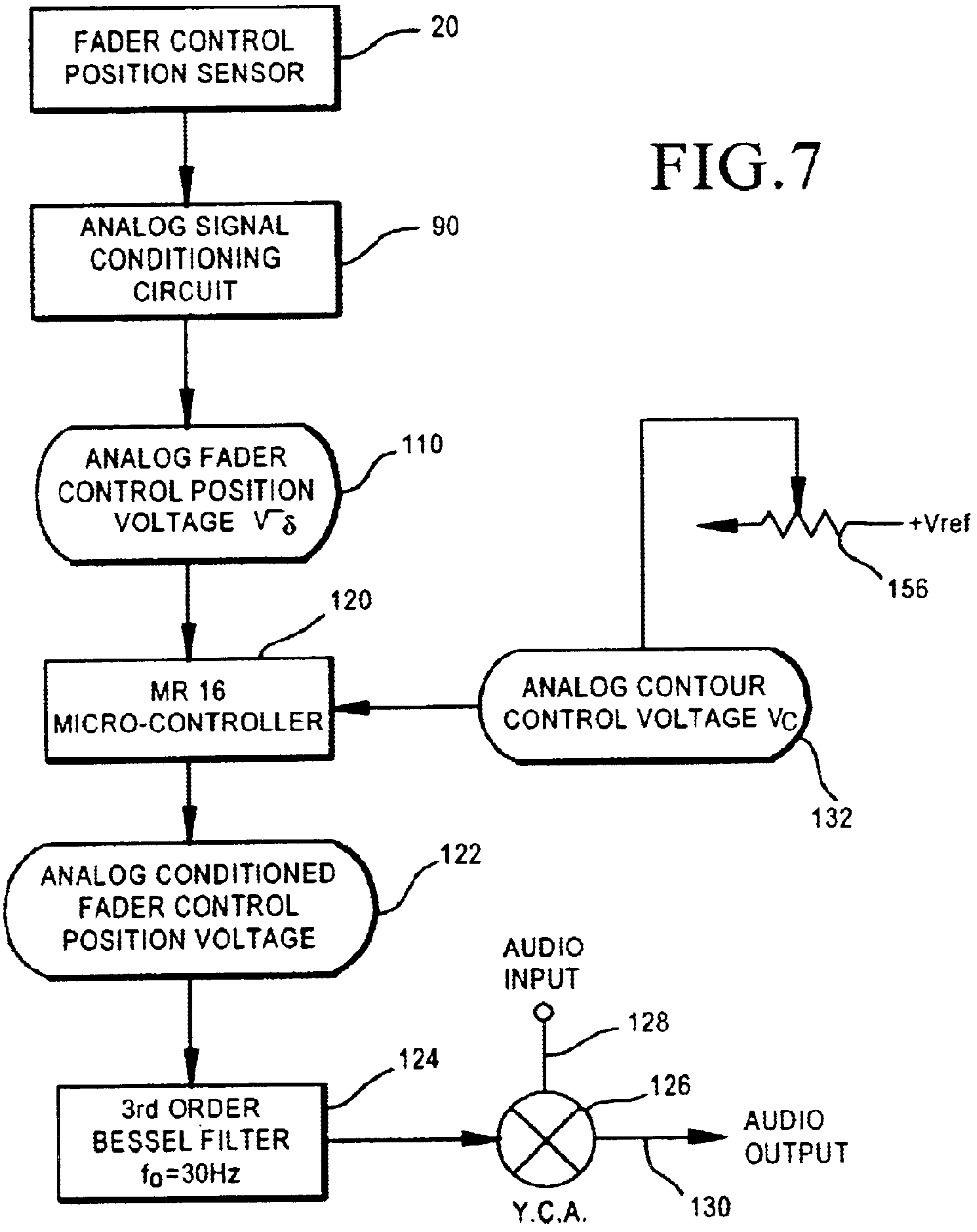
FIG. 7 is a schematic block diagram of a fader control system of the present invention.

FIG. 7 illustrates, in block diagram form, a complete fader control system for audio applications. In this system, the analog position signal 110 $V_0$ from the fader control 20 and analog signal conditioning circuit 90 is applied to a digital micro-controller 120 for digitizing the signal, modifying the digitized signal according to a variety of parameters, and converting the modified digital signal back into an analog, conditioned fader control position voltage 122. That position voltage 122 can be further filtered by an appropriate analog filter 124, the output of which is applied to a conventional voltage controlled amplifier 126 which also receives a conventional audio input signal 128 from a source (not shown) such as a turntable or tape deck. The voltage controlled amplifier 126 produces an audio output 130 which is a proportion of the audio input 128 as determined by the analog, conditioned fader control position voltage 122. However, the digital micro-controller 120 is capable of applying a variety of mathematical transformations to the analog fader control position voltage $V_0$ 110 such as further digital filtering, initial offset correction, digital hysteresis offset correction, curve linearization, and contour control input 132 from the audio mixing artist.

An appropriate micro-controller is a Model No. 68HC908MR16 embedded micro-controller manufactured by Motorola Corp., Illinois. This micro-controller is end-circuit programmable, has ten, 10-bit analog to digital (A/D) converters, 12-bit pulse width modulation (PWM) for motor control (also usable in D/A conversion), both asynchronous and synchronous serial communications interface, and integrated second generation FLASH memory.

Figure 10:
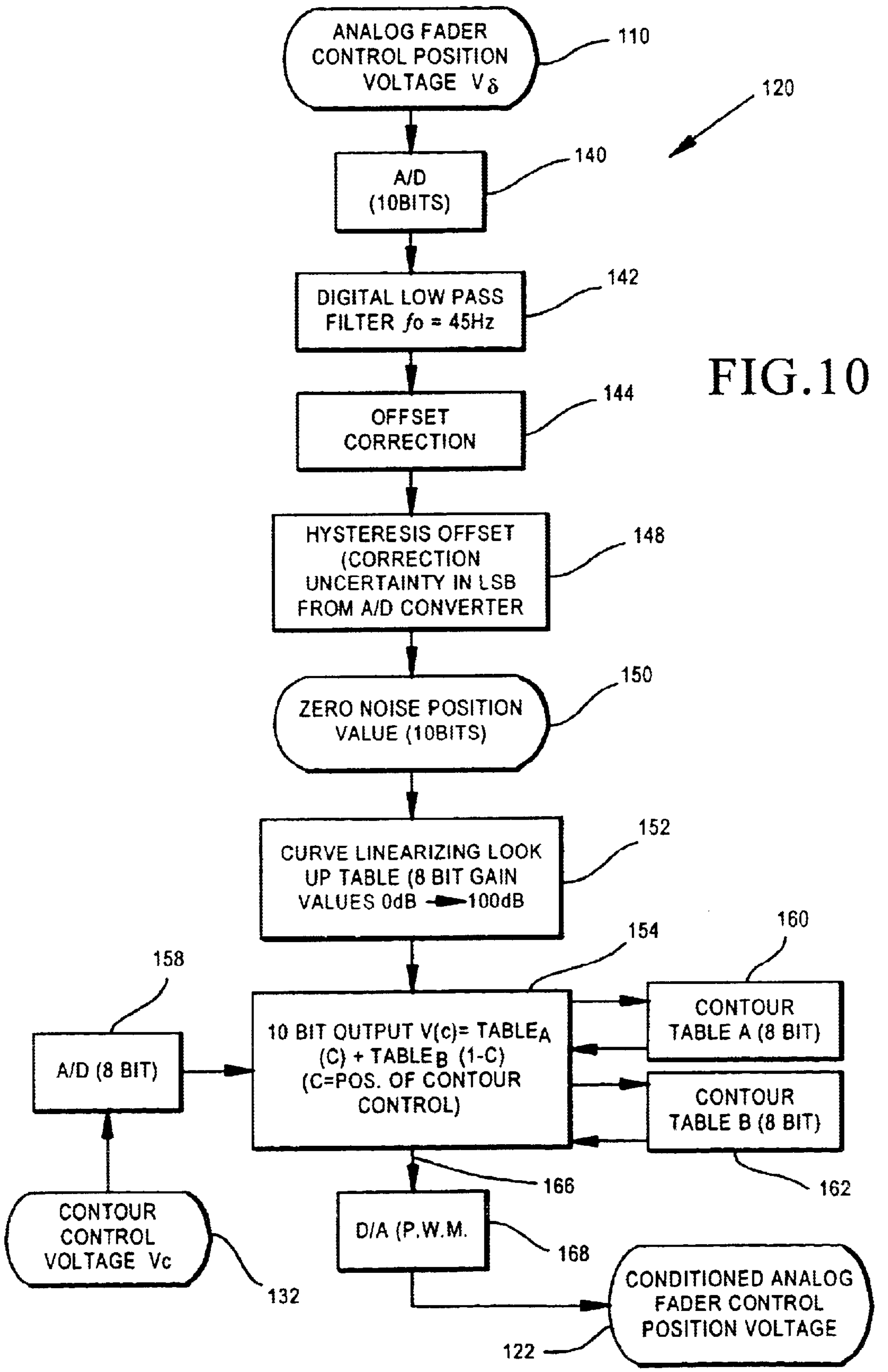
FIG. 10 is a logic flow diagram for the micro-controller shown in the block diagram of FIG. 7.

FIG. 10 illustrates a logic flow diagram for the micro-controller 120. Those of ordinary skill in the art are familiar with programming micro-controllers, thus this information is provided in block diagram form. The micro-controller first converts the analog fader control position voltage $V_0$ 110 into a 10-bit digital word at one of its internal A/D converters 140. The micro-controller then applies a digital low pass filter 142 having a cut-off frequency selected at approximately 45 Hz. to the digital word. The micro-controller next permits the manufacturer to apply an offset correction 144 to the fader control position sensor 20. Such correction may be required if the Hall-effect sensors 80, 82 are not completely balanced or if there is some imprecision in the mounting of the magnet 62 within the carrier 40. For this purpose, a central index mark, such as mark 146, can be provided on the printed circuit board 22. The factory technician positions the carrier 40 so as to be centered about this mark. If the output $V_0$ of the analog signal conditioning circuit 90 does not match the anticipated output voltage according to the graph shown in FIG. 6, a digital offset correction can be applied in FLASH memory.

Figure 9:
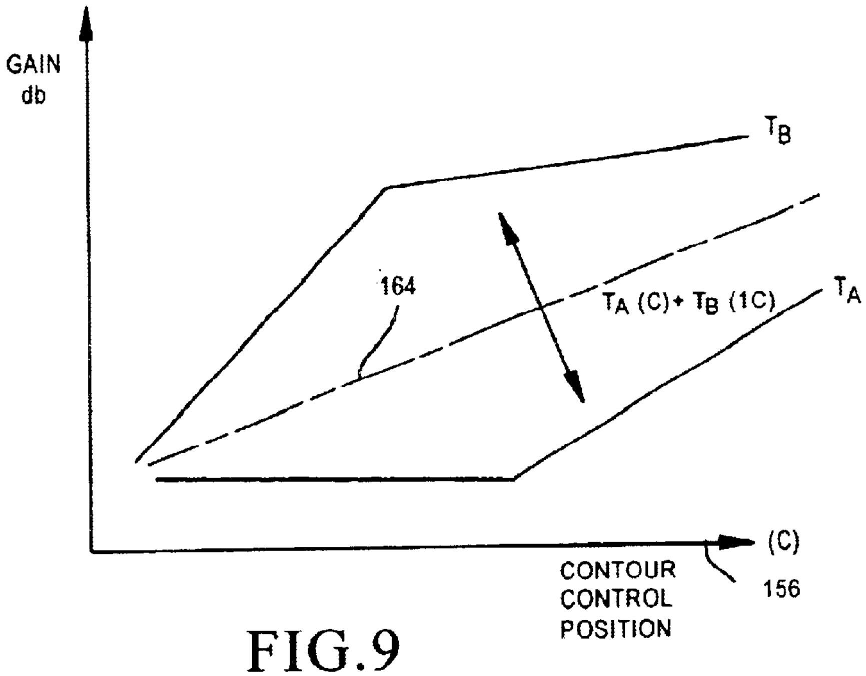
FIG. 9 is a graphical representation of a morphing function between two gain transfer functions under the adjustment of contour control versus gain attenuation.

Next, it is often necessary to correct an uncertainty in the least significant bit (LSB) of the digital word because the analog to digital converting is attempting to convert an analog voltage $V_0$ 110 which is indeterminate between two digital values. A "hysteresis" offset function 148 compares at least two previously measured values of the voltage $V_0$ 110 and determines whether the values are rising or falling. If the values have been rising, then the LSB is incremented one bit. If the values have been declining, then the LSB is decremented one bit. At this logic step, the 10-bit digital word 150 represents a zero noise position value 150 of the magnet 62 with respect to the first and second flux detectors 80, 82. As is well known to those of ordinary skill in the audio art, the human ear does not respond to perceived volume in a linear fashion. In fact, the relationship between perceived volume and actual power output is strongly non-linear, and is almost logarithmic. Varieties of "standard listener curves" are available to audio designers to provide a constant power curve response which is indicative of perceived linear volume changes to the human ear. These transfer functions can be implemented as a curve-linearizing look-up table 152 within the micro-controller 100. In this preferred embodiment, the transfer function is actually stored as 8-bit words in a 10-bit look-up table to maximize access speed, with intermediate values being interpolated, if necessary. The values in the look-up table 152 represent gain values of from 0 dB to −100 dB. The resulting digitized, filtered, offset-corrected, hysteresis corrected, zero noise position, linearized digital word is then output to a contour control transfer function block 154 which provides for manual input by the audio mixing artist to customize the gain transfer function of an audio mixer to his or her personal preference. As best seen in FIG. 7, the fader control system is provided with a manual contour control 156 in the form of a potentiometer or the like so as to provide an analog contour voltage $V_C$ 132. That voltage is then digitized by an internal A/D converter 158 within the micro-controller 120. The contour control transfer function 154 addresses a first contour Table A 160 and a second contour Table B 162. Both contour tables contain 8-bit data representing different audio gain transfer functions. Two examples of the data contained in Table A and Table B are illustrated in FIG. 9 wherein a graph is presented which represents the manual position of the contour control 156 with respect to the gain transfer function of each table in decibels. It can be seen that the transfer function for Table A and Table B are different. Nevertheless, the contour control transfer function 154 logically combines the data from contour Table A and the data from contour Table B according to the following sum: V(c)=Table A(c)+Table B(1-c) wherein "c" represents the manual position of the contour control potentiometer 156. Thus, the output of the contour control transfer function block 154 is a "morphed" transfer function represented by dashed line 164 in FIG. 9. It will be apparent to those of ordinary skill in the art that the transfer functions shown in Table A and Table B in FIG. 9 can have any particular shape, yet the audio mixing artist can customize that transfer function by morphing the data between the two tables to suit his or her taste. In the example shown, the data in Table A results in a very slow change in gain during the initial one-half turn of the potentiometer and a very rapid change in gain with respect to the second half full turn of the potentiometer. Conversely, the data in Table B indicates a very rapid change in gain with respect to the first 180 degrees rotation of the potentiometer, while the change in gain with respect to the second 180 degree rotation of the potentiometer results in very little change in gain. Nevertheless, by rotating the contour control, the "morphed" gain transfer function is a compromise between these two extreme positions.

Finally, the digital micro-controller 120 converts the output 166 from the contour control transfer function block 154 into an analog voltage by way of an internal pulse width modulator 168 so as to produce an analog, conditioned position voltage 122 which, as previously stated, is indicative of the position of the magnet 62.

Figure 8:
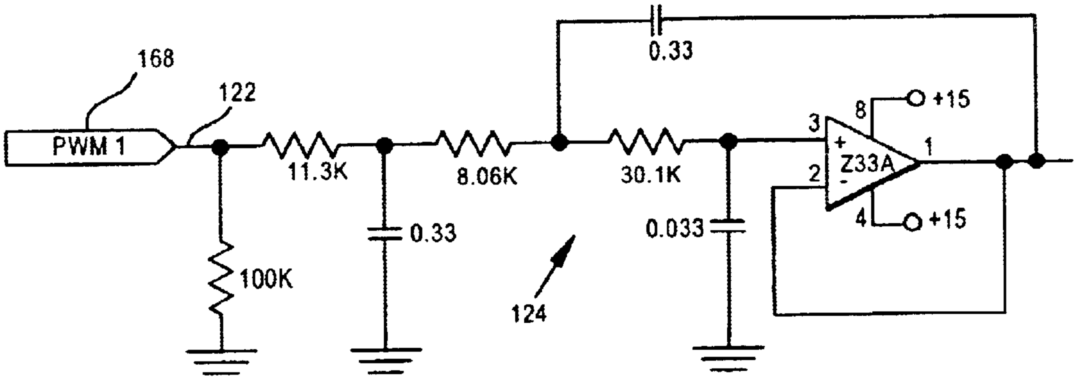
FIG. 8 is an electronic schematic of a Bessel filter for performing a digital to analog conversion in connection with the present invention.

As those of ordinary skill in the art are well aware, a pulse width modulated signal is not a fully analog signal. Therefore, as previously described, the analog, conditioned position voltage 122 is further processed by the low frequency filter 124 to provide a true analog output to the voltage control amplifier 126. In the preferred embodiment of the invention, this final signal conditioning is preferably provided by a third order Bessel filter having a corner frequency of approximately 30 Hz. In the preferred embodiment, the pulse width modulator 168 is operated in 8-bit mode, resulting in an oscillator frequency of about 28 kHz. The ports of the pulse width modulator 168 are capable of 10-bit resolution; however, 8-bit resolution has been determined to be adequate and significantly reduces the size of the gain look-up tables described above. The Bessel filter alignment was selected for its excellent transient response and minimal delay for a given corner frequency. The range of gain control was selected to be 100 dB or about 0.4 dB per step. By setting the corner frequency of the filter at 30 Hz, attenuation of the pulse width modulation base frequency is over 177 dB, which is well below the noise for the filter. The corner frequency was selected to limit the rise time to a value required to track position change at a rate transparent to the user and no faster. By doing so, gain steps are integrated, reducing control feed through at the voltage controlled amplifier 126, and providing a smooth analog response. As will be appreciated by those of ordinary skill in the art, because the gain setting is deterministic and noise free, and because the base frequency of the pulse width modulator 168 is completely removed, system noise is completely dependent on the noise of the demodulating filter and nothing else. An appropriate third order Bessel filter 124 is shown in FIG. 8.

Figure 11:
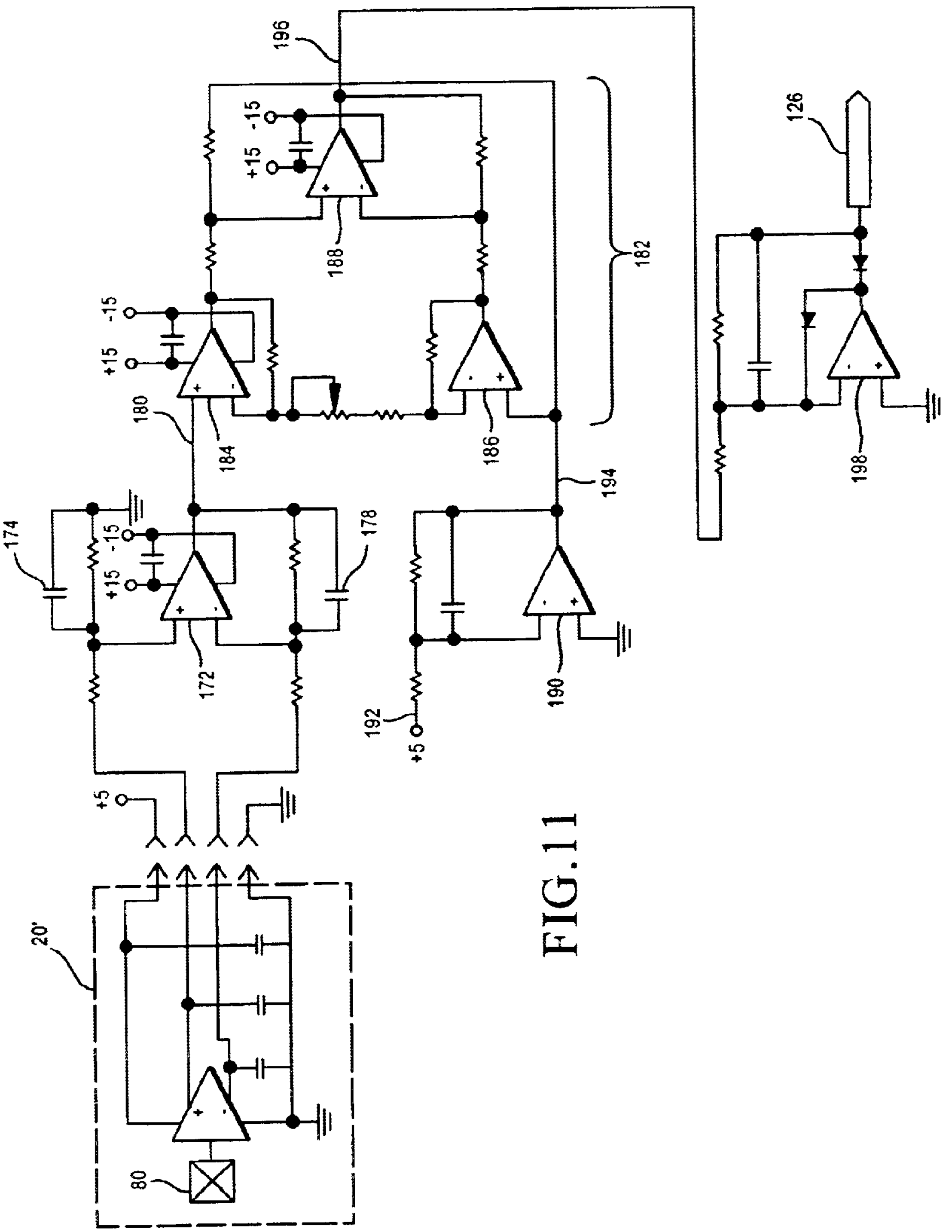
FIG. 11 is an analog circuit for conditioning the output of a non-contact magnetic position sensor for application to a voltage-controlled amplifier and illustrates an alternate embodiment of the invention.

Those of ordinary skill in the art will appreciate that other embodiments of the invention are contemplated, and are within the scope of this disclosure. For example, a substantial portion of the signal processing used in connection with the preferred embodiment of the invention described above is digital. However, the non-linear output of a Hall-effect sensor with respect to distance from a flux source can be advantageously applied in a pure analog system, because the non-linear relationship of flux density to magnet position closely matches the relationship of applied power to perceived volume by a listener as in a standard listener curve. Thus, an alternate embodiment of the invention is shown in FIG. 11 in which like-numbered parts have identical reference numerals. In this alternate embodiment, the non-contact magnet fader control 20' only uses a single Hall-effect sensor 80. The output of pins 2 and 3 represent the voltage potential across the Hall-effect sensor. That voltage is applied to the inputs of an operational amplifier 162 configured as a difference amplifier having unity gain. Capacitors 174 and 178 are selected such as to provide a low pass cut-off frequency of approximately 3 kHz. The output of operational amplifier 172 is provided to one input 180 of a variable gain, differential input instrumentation amplifier 182 comprising operational amplifiers 184, 186 and 188, as will be well understood by those of ordinary skill in the art.

The preferred Hall-sensor used in this application is a HALL-400 made by Micronas Semiconductor Holding, Zurich, Switzerland. The output is 0 volts to 4 volts(5–35 mm travel). As previously stated, the output of the Hall-effect sensor 80 applied to the differential inputs of the operational amplifier 172 will be approximately 0 volts to 4.0 volts. Depending on the actual Hall-effect sensor use, this voltage range may be D.C. shifted to a higher level. This alternate embodiment is therefore provided with operational amplifier 190 configured as an inverting amplifier with a gain of approximately 0.75. By applying a six volt D.C. signal to the source resistor 192, an offset voltage of about four volts appears at the other input 194 of the instrumentation amplifier 182. Thus, output 196 of the instrumentation amplifier rereferences the input to the difference amplifier 172 to ground. A further operational amplifier 198 can be provided, configured as an inverting amplifier to rectify the output 196, providing a further attenuation or amplification as required and buffering the resulting signal to the voltage controlled amplifier 126.

The circuitry shown in FIG. 11 advantageously utilizes the natural shape of the Hall-effect sensor output curve (essentially the first half of the graph shown in FIG. 6) to provide a semi-logarithmic input to the voltage controlled amplifier 126 without the need for sophisticated digital circuitry. Thus, relatively inexpensive control circuitry can be provided for a simplified fader control system employing the concept of the present invention. Nevertheless, because the sum of two Hall-effect sensors are not utilized, the non-contact magnetic fader control 20' only has an effective travel range of approximately 30 mm.

In view of the above, the invention is not to be limited by the above disclosure but is to be determined in scope by the claims which follow.

I claim:

1. A fader control system for audio applications, comprising:

a linear position sensor having a permanent magnet defining a magnetic flux axis mounted on a carrier linearly movable between spaced apart, relatively fixed first and second magnetic flux detectors wherein the flux detectors are substantially positioned on the flux axis, the flux detectors having flux polarities and electrical outputs opposite one another;

an electronic signal conditioning circuit connected to the flux detectors for summing the electrical outputs of the flux detectors so as to provide an analog position signal having a magnitude indicative of a specific, monotonic linear position of the carrier with respect to the flux detectors; and, means for manipulating the carrier.

2. The fader control system of claim 1, wherein the flux detectors are Hall-effect sensors.

3. The fader control system of claim 2, wherein the magnet has a stabilized flux density of approximately 11,000 Gauss, the flux detectors have a separation distance of approximately 37 mm, and wherein the first flux detector has a direct current output voltage between approximately 2.5 volts and 4.2 volts and wherein the second flux detector has a direct current output voltage between approximately 0.8 volts and 2.5 volts, the direct current output voltages being dependent on the linear position of the carrier.

4. The fader control system of claim 1, wherein the carrier is slidably mounted on two elongated, parallel, laterally spaced apart rails.

5. The fader control system of claim 1, wherein the magnet and carrier have a preselected weight and wherein the carrier has means for applying a drag force to the carrier approximately equal to the preselected weight.

6. The fader control system of claim 1, including a voltage controlled amplifier operatively connected to the electronic signal conditioning circuit and to an audio source for producing an audio output whereby the audio output is proportional to the analog position signal.

7. The fader control system of claim 1, including digital signal processing means for digitizing the analog position signal and for conforming the digitized position signal with respect to a standard listener curve transfer function so as to conform the digitized position signal with a standard listener curve and for transforming the digitized, conformed, position signal into an analog, conditioned position signal.

8. The fader control system of claim 7, including a voltage controlled amplifier operatively connected to the digital signal processing means and to an audio source for producing an audio output whereby the audio output is proportional to the analog conditioned position signal.

9. The fader control system of claim 7, including a contour control, operatively interconnected with the digital signal processing means, for providing the digital signal processing means with a digital signal indicative of a position of the contour control, wherein the digital signal processing means also has first and second contour control look up tables having different data sets representing two different audio gain transfer functions, and wherein the digital signal processing means transforms the digitized, conformed, position signal into a convoluted digital output "V(c)" which is equal to a sum of data from the first contour control look up table "Table A(c)" and data from the second contour control look up table "Table B(1-c)" wherein "c" represents a fraction of a full scale position of the contour control such that V(c) is a convoluted representation of a data point related to the two data sets.

10. The fader control system of claim 9, wherein the digital signal processing means includes an initial offset correction function and a hysteresis offset function.

11. A linear, non-contact fader control for audio applications, comprising:

two elongated, substantially parallel, laterally space apart rails;

a low friction carrier having means for slidably receiving the rails;

a permanent magnet defining a magnetic flux axis mounted on the carrier such that the magnetic flux axis is substantially parallel to the rails;

spaced apart, relatively fixed first and second magnetic flux detectors substantially positioned on the flux axis such that the carrier and permanent magnet are linearly moveable therebetween, the flux detectors having flux polarities and electrical outputs opposite one another; and, means for manipulating the carrier.

12. The fader control of claim 11, wherein the flux detectors are Hall effect sensors.

13. The fader control of claim 12, wherein the permanent magnet has a stabilized flux density of approximately 11,000 gauss, the flux detectors have a separation distance of approximately 37 mm.

14. The fader control system of claim 13, wherein the first flux detector has a direct current output between approximately 2.5 volts and 4.2 volts and wherein the second flux detector has a direct current output voltage between approximately 0.8 volts and 2.5 volts.

15. The fader control system of claim 11, wherein the magnet and carrier have a preselected weight and wherein the carrier has means for applying a drag force to the carrier approximately equal to the preselected weight.

16. The fader control of claim 15, wherein the means for applying a drag force includes a torsion spring having a first portion positioned to react against the carrier and a second portion in contact with one of the rails.

17. A method for conditioning an analog voltage output of a non-contact position sensor for audio applications, comprising the steps of:

digitizing the analog output voltage;

conforming the digitized analog output to standard listener curve;

transforming the conformed, digitized analog output by application of data from two separate contour control look up tables wherein a convoluted digital output voltage "V(c)" is provided and is equal to a sum of data from a first one of the contour control look up tables "Table A(c)" and data from a second one of the contour control look up tables "Table B(1-c)" wherein "C" represents a fraction of a full scale position of a physical contour control such that V(c) represents a convoluted digital representation of a data point related to the two data sets; and, converting the digital voltage V(c) into a conditioned analog output voltage.

18. The method of claim 17 wherein the conditioned analog output voltage is applied to a voltage controlled amplifier operatively connected an audio source for producing an audio output whereby the audio output is proportional to the conditioned analog output voltage.

19. The method of claim 17 including the step of correcting an uncertainty in a digital value of the analog output voltage by incrementing a least significant bit of the digital value if the analog output voltage was previously increasing and decrementing the least significant bit of the digital value if the analog output voltage was previously decreasing.

20. The method of claim 17 wherein the digital voltage V(c) is pulse width modulated and wherein the converting step is achieved by applying the pulse width modulated digital voltage V(c) to a third order Bessel filter.

* * * * *